June 3, 1930.  M. D. REIS, JR., ET AL  1,761,681
SAFETY SWITCH
Filed July 22, 1927
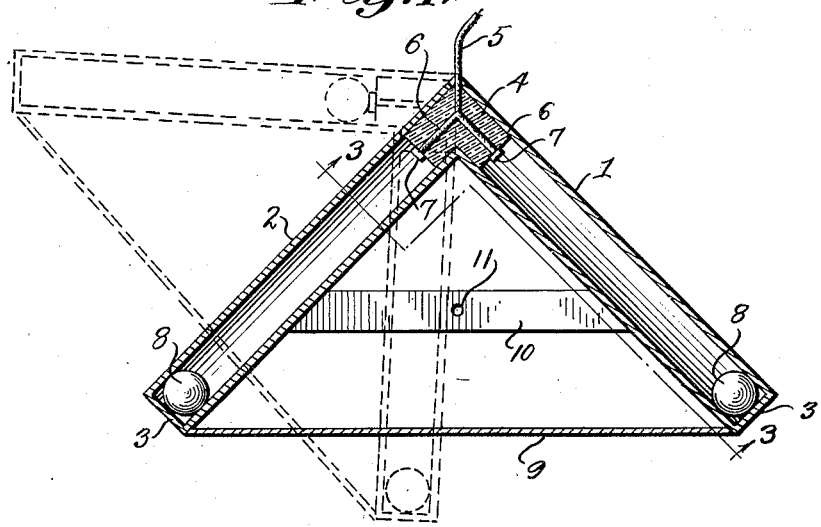
WITNESSES
F. E. Padman
Geo. H. Porter
INVENTOR.
Arthur F. Meade and
Manuel Dos Reis Jr.
BY
Richard B. Owen.
ATTORNEY.

Patented June 3, 1930

1,761,681

UNITED STATES PATENT OFFICE

MANUEL DOS REIS, JR., AND ARTHUR F. MEADE, OF SAN ANSELMO, CALIFORNIA

SAFETY SWITCH

Application filed July 22, 1927. Serial No. 207,761.

This invention relates to safety devices and pertains particularly to a safety device for automobiles, motorcycles, etc.

The primary object of this invention is to provide in a manner as hereinafter set forth, means whereby the ignition of a motor vehicle can be short circuited automatically in the event that the vehicle overturns, to prevent the continued running of the vehicle engine and consequent ignition of the engine fuel which usually escapes and spreads over the engine.

The invention contemplates the provision of a member in the form of two tubular bodies arranged to form a right angle, with a body of insulation at the point of connection of the bodies or in the angles, having a wire leading thereinto from the ignition circuit of the engine and exposed within each of the tubular bodies. Each of the tubes contains a metallic ball which when the engine is in upright position occupies the far end of the tube remote from the ignition wire. The tubes being of metal are grounded to the engine and in the event that the vehicle overturns the device will also be overturned and one of the balls will gravitate toward the angle of the device and form a contact with the ignition wire short circuiting the same through the tube and the engine body thereby causing the cessation of the operation of the engine.

Another object of the present invention is to provide a device of the above described character which will be of simple construction, inexpensive to manufacture and easy to install.

Numerous other advantages of the invention will become apparent as the description of the same proceeds, and the invention will be best understood from a consideration of the following detailed description taken in connection with the accompaning drawing forming a part of this specification, with the understanding, however, that the invention is not confined to a strict conformity with the showing of the drawing but may be changed or modified so long as such changes or modifications mark no material departure from the salient features of the invention as expressed in the appended claim.

In the drawings:

Figure 1 shows the device in longitudinal section in its normal upright position.

Figure 2 is a plan view of this device.

Figure 3 is a section taken on the line 3—3 of Figure 1.

Referring now to the drawings in detail wherein like numerals of reference indicate the corresponding parts throughout the several views, the numerals 1 and 2 indicate a pair of metallic cylinders secured together at their ends to form a right angle and having their outer ends closed as at 3.

At the apex of the body or the point of joinder between the two cylinders, there is positioned within the cylinders a body of insulation 4 and into this body of insulation through the apex of the device a wire 5 is lead being forked in the insulation body to provide the divided leads 6 each of which terminates in the contact 7 on an inner face of the insulation body, in one of the metallic cylinders.

Freely slidable within each of the cylinders is a metallic ball 8 which under normal conditions occupies that end of its respective cylinder remote from the contact 7. The free ends of the cylinders 1 and 2 are connected by the bar 9 to give strength or rigidity to the structure and intermediate their ends a bar member 10 is secured connecting the cylinders together which bar has its intermediate lower portion provided with the aperture 11.

When in operative position the device is mounted by passing a pin through the aperture 11 so that the apex of the device is uppermost and the balls 8 will normally occupy the position shown in Figure 1. The wire 5 is connected to an appropriate wire in the ignition system of the engine. In the event of turning of the engine, the device will be partly or completely inverted which will result in one or both of the balls 8 gravitating toward the apex of the device and contacting with one of the contacts 7 thus short circuiting the ignition current through the cylinder and into the engine frame or body, the result being the stopping of the operation of the engine.

From the foregoing it will be understood that a device of the present character is very desirable on motor devices such as motorcycles or other vehicles which are apt to overturn as the danger from fire or explosion will be materially reduced through the immediate stopping of the vehicle engine thereby preventing the ignition of any gasoline which might escape from the vehicle gasoline tank and spread over the engine.

Having thus described our invention what we claim is:

A switch of the class set forth, comprising angularly related metallic cylinders arranged in a vertical plane and having their adjacent or upper ends connected together and having their remote or lower ends closed, a body of insulation arranged in the upper ends of the cylinders, a contact arranged in each cylinder and carried by the body of insulation, a wire connected to the contacts and extending beyond the cylinders, a metallic ball movably arranged in and normally resting against the closed end of each cylinder, a reinforcing bar extending from one cylinder to the other and fixed at its ends to the closed lower ends of the cylinders, and a second bar extending from one cylinder to the other and fixed at its ends to the cylinders above said first bar, said second bar being provided centrally between its ends with an opening for the reception of an element adapted to pivotally support the switch.

In testimony whereof we affix our signatures.

MANUEL DOS REIS, Jr.
ARTHUR F. MEADE.